United States Patent [19]

Kuo

[11] Patent Number: 5,110,250
[45] Date of Patent: May 5, 1992

[54] DOUBLE-STORY PARKING APPARATUS HAVING TELESCOPIC ACCESS

[76] Inventor: Zeal-Sain Kuo, c/o Hung Hsing Patent Service Center, P.O. Box 55-1670, Taipei Hsien, Taiwan

[21] Appl. No.: 630,287

[22] Filed: Dec. 18, 1990

[51] Int. Cl.⁵ .............................. B65G 11/18
[52] U.S. Cl. ..................... 414/229; 414/537
[58] Field of Search .......... 414/228, 229, 230, 233, 414/227, 537

[56] References Cited

U.S. PATENT DOCUMENTS

| | | |
|---|---|---|
| 2,523,723 | 9/1950 | Santee et al. ............ 414/537 |
| 3,027,580 | 4/1962 | Haack ................ 414/537 X |
| 3,469,717 | 9/1969 | Bolt .................... 414/230 |
| 3,599,382 | 8/1971 | Stone, Jr. ............. 414/228 X |
| 3,941,257 | 3/1976 | Matsuura ............. 414/229 X |
| 4,674,938 | 6/1987 | Van Stokes et al. ........ 414/228 |
| 4,892,452 | 1/1990 | Moynihan ............. 414/229 |

FOREIGN PATENT DOCUMENTS

| | | |
|---|---|---|
| 2010799 | 11/1971 | Fed. Rep. of Germany ...... 414/229 |
| 2301947 | 7/1974 | Fed. Rep. of Germany ...... 414/229 |
| 2315417 | 10/1974 | Fed. Rep. of Germany ...... 414/229 |
| 1320651 | 1/1963 | France .................... 414/229 |
| 1-318667 | 12/1989 | Japan ..................... 414/228 |
| 2-221566 | 9/1990 | Japan ..................... 414/229 |
| 998458 | 7/1965 | United Kingdom ............. 414/229 |
| 1177073 | 1/1970 | United Kingdom ............. 414/228 |

Primary Examiner—Robert J. Spar
Assistant Examiner—Robert Katz

[57] ABSTRACT

A double-story parking apparatus includes a fixed elevated platform mounted on a plurality of supporting columns standing on a ground floor, and a telescopic access pivotally secured to the elevated platform operatively lowered and extended to form a sloping path adapted for driving a car upwardly onto the elevated platform for parking a first car on the elevated platform. The telescopic access may then be retracted and raised to form a horizontal plane coplanar to the elevated platform to level the parked first car and a second car can be directly parked on the floor whereon the supporting columns stand.

1 Claim, 6 Drawing Sheets

DOUBLE-STORY PARKING APPARATUS HAVING TELESCOPIC ACCESS

BACKGROUND OF THE INVENTION

A conventional double-story parking system as shown in FIG. 10 includes a platform P movably supported by four columns C, which platform P can be raised by hydraulic means to form a parking frame of two stories for parking two cars C1, C2 thereon.

However, it still has the following drawbacks:

1. When it is intended to use the car C1, parked on the second floor, the lower car C2 should be first driven away from the parking frame to allow the descending of the platform P for leaving the upper car C1 from the platform P, causing inconvenience for the owners or drivers of the two cars C1, C2.

2. Similarly, if the "first floor" is already occupied by a lower car C2, how can the "second floor" of platform P be used for parking an upper car C1?

3. The raising or descending mechanism of the platform actuated by hydraulic system is quite complex and will increase its installation cost.

The present inventor has found the defects of the conventional parking frame and invented the present parking apparatus of simpler construction and convenient operation.

SUMMARY OF THE INVENTION

The object of the present invention is to provide a double-story parking apparatus including an elevated platform mounted on a plurality of supporting columns standing on a floor, and a telescopic access pivotally secured to the elevated platform operatively lowered and extended to form a sloping path adapted for driving a car upwardly onto the elevated platform for parking a first car on the elevated platform. The telescopic access may then be retracted and raised to form a horizontal plane coplanar to the elevated platform to level the parked first car and a second car can be directly parked on the floor whereon the supporting columns stand.

DETAILED DESCRIPTION

Figure 1:
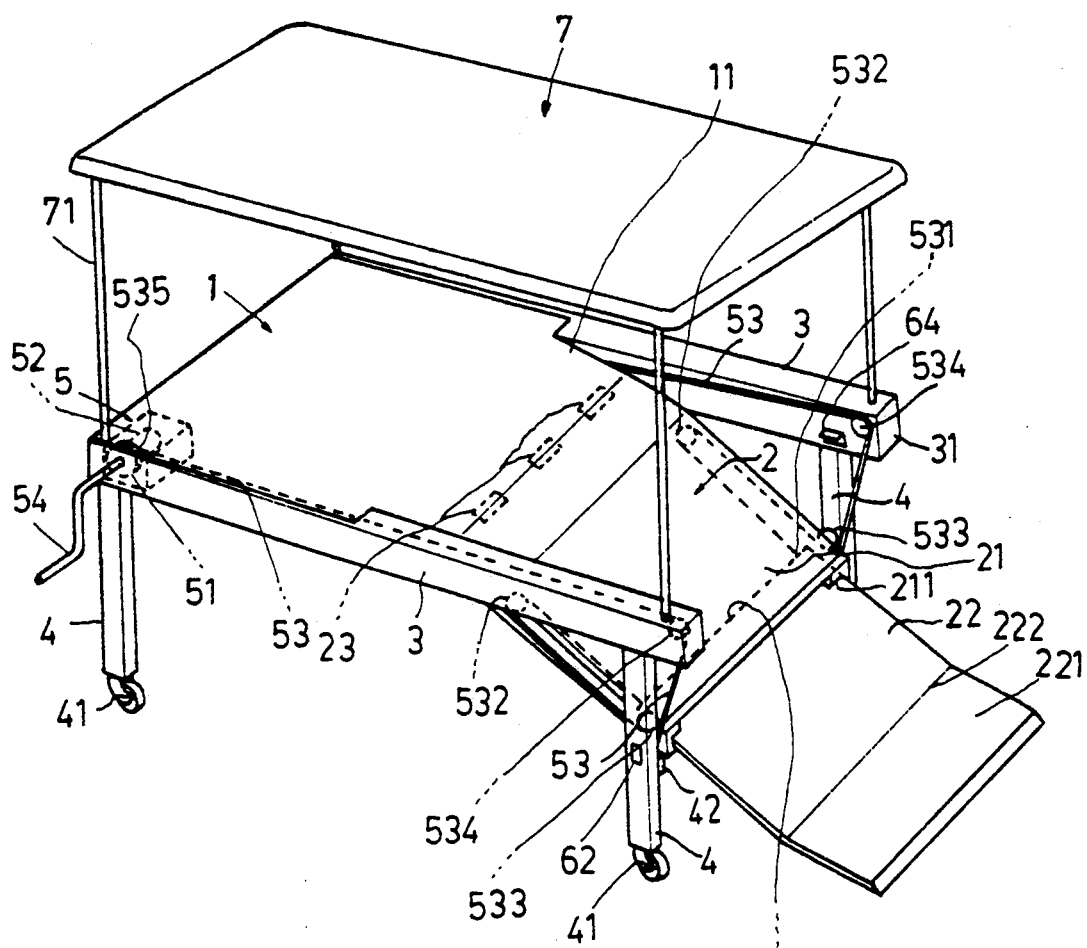
FIG. 1 is an illustration of the present invention.
Figure 10:
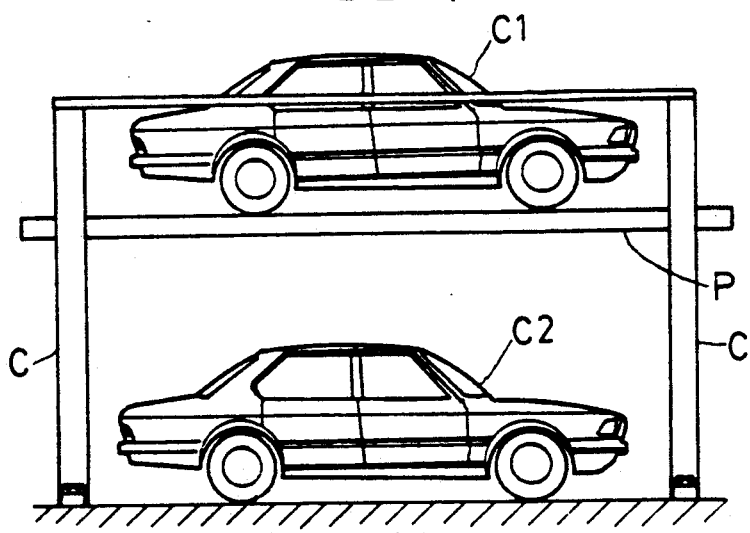
FIG. 10 shows a prior art of a conventional parking frame.

As shown in FIGS. 1-8, the present invention comprises: a fixed elevated horizontal platform 1, a telescopic access 2, at least two horizontal longitudinal beams 3, a plurality of supporting columns 4, a driving means 5, an electric controller 6, and a roof shield 7.

The elevated horizontal platform 1 is mounted on the two (or plural) horizontal longitudinal beams 3. The supporting columns 4 are provided to fix and support the beams 3 to support the platform 1 on a ground floor. Each column 4 may be mounted with a wheel 41 on a lower portion of the column 4 for movable purpose.

The telescopic access 2 includes: an upper guide plate 21 pivotally secured to a front edge portion 11 of the platform 1 by hinge 23, and a lower entry plate 22 telescopically mounted in two U-shaped grooves 211 formed on two opposite side portions under the guide plate 21. The entry plate 22 may be further formed with a slight-slope plate 221 on a front edge of the plate 22 having a bending portion 222 between the plate 22 and plate 221.

The driving means 5 includes at least a reel 51 driven by a motor 52, and at least a wire 53 wound on the reel 51 connected to the telescopic access 2 through several rollers 532, 533 and 534. A manual crank handle 54 may be detachably mounted on a shaft of the reel 51 and motor 52 for mannually rotating the reel for winding wire 53 when power failure is caused.

The wire 53 has its front (outer) end portion 531 secured to a rear end portion 223 of the lower entry plate 22 and has its rear (inner) end portion 535 fixed on a spindle of the reel 51. A pair of first rollers 532 are rotatably mounted on two rear portions of the two grooves 211 respectively. A pair of second rollers 533 are rotatably mounted on two sides of an outer (front) portion of the upper guide plate 21. A pair of third rollers 534 are rotatably mounted on each front portion 31 of the two beams 3.

Figure 2:
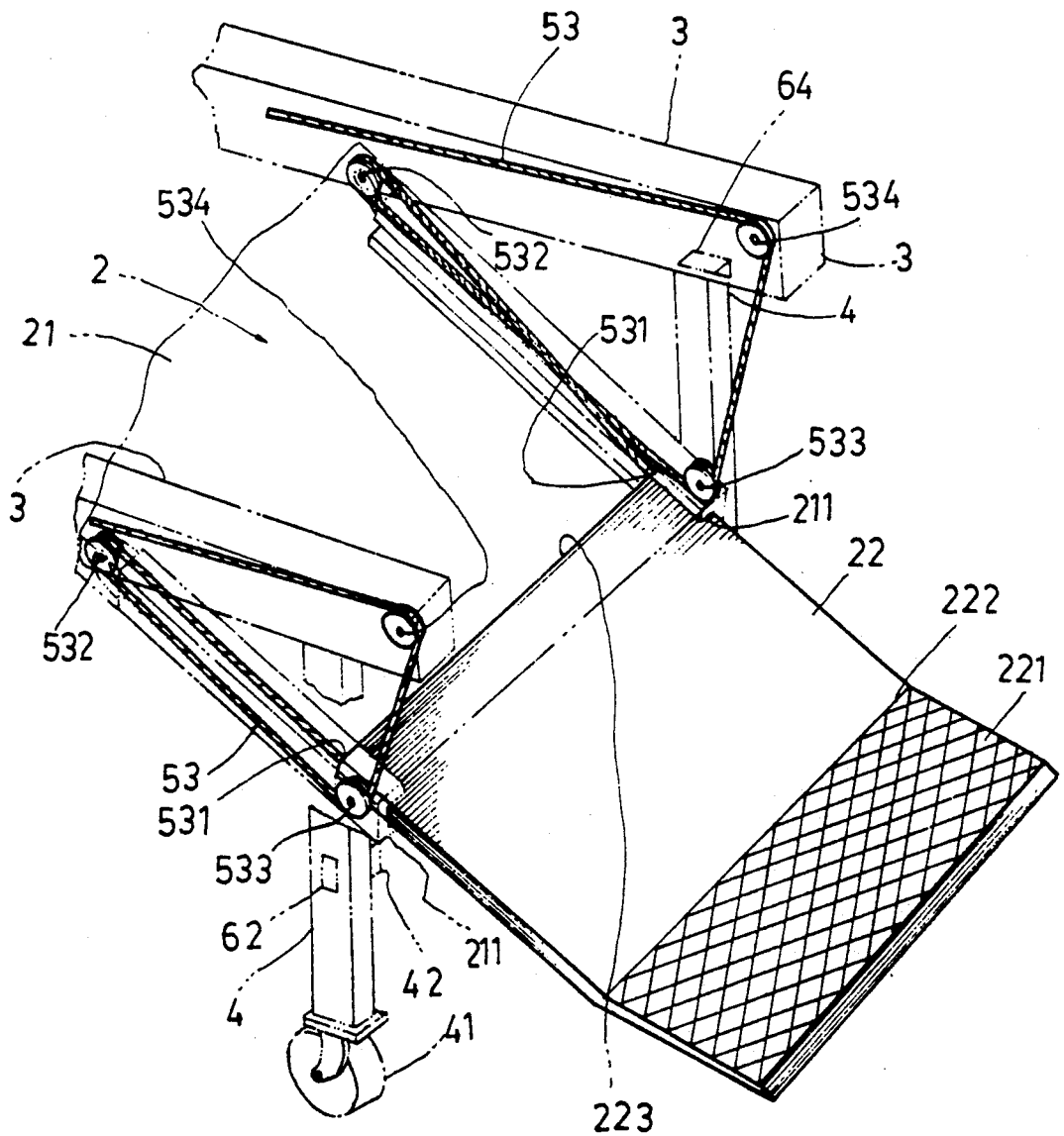
FIG. 2 is a partial perspective drawing of the present invention.
Figure 3:
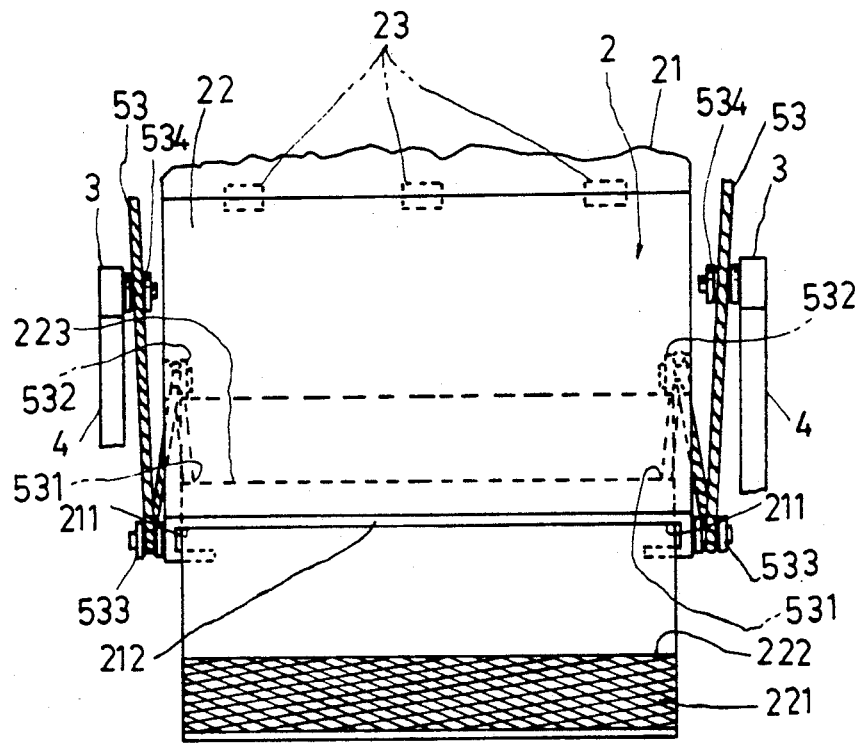
FIG. 3 is a partial front view illustration of the present invention.

As shown in FIGS. 1-3, the driving means 5 may include two sets of reels 51, motors 52, and wires 53. Each wire 53 passes through the first roller 532, the second roller 533, and the third roller 534 to be wound on the reel 51. One motor 52 may also be provided for commonly driving two reels 51 and two wires 53.

The electric controller 6 includes: a power source 61, a control switch 62 for rotating the motor 52 forwardly or for reversely rotating the motor 52 (which can be controlled remotely or manually), an electromagnet 63, an upper stopper 64, a raising limit switch 65 and a descending limit switch 66.

The roof shield 7 may be mounted on the platform 1 by several supporting rods 71.

Figure 9:
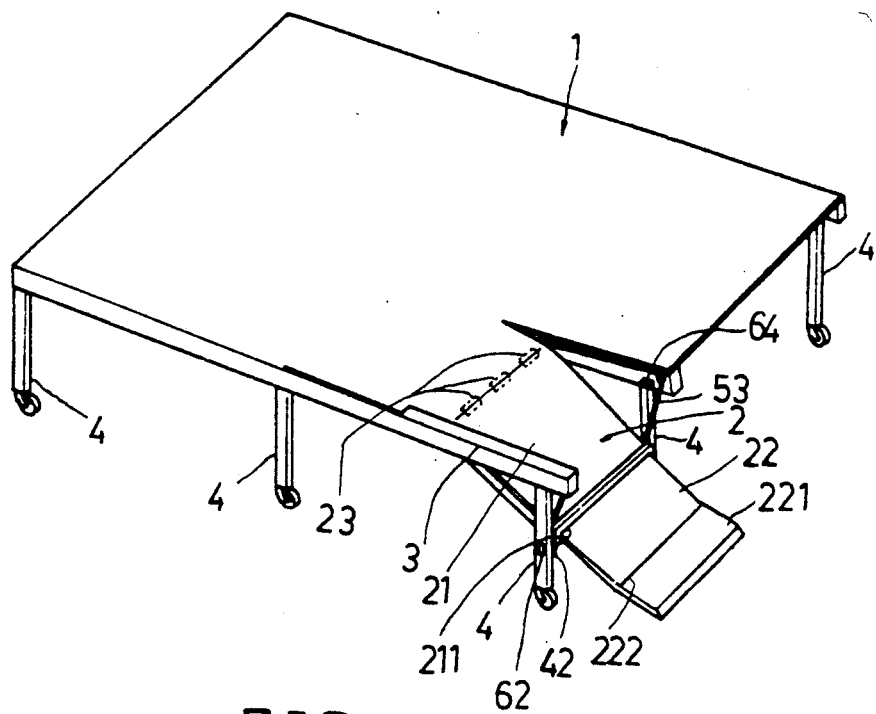
FIG. 9 shows another preferred embodiment of the present invention.

The present invention may be modified to increase the parking area of the platform 1 as shown in FIG. 9 having the access 2 provided on a corner of the platform 1 for parking many cars on the two-story parking apparatus. The platform 1 may also be increased to be multiple stories for parking more cars on a public parking zone having each access 2 provided between two adjacent platforms 1.

Figure 4:
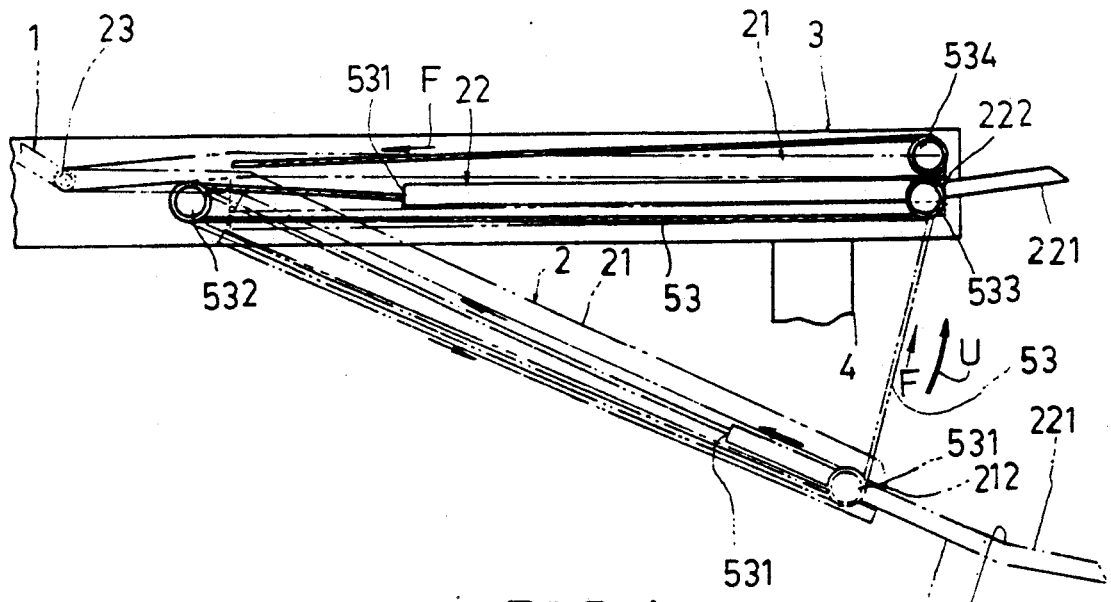
FIG. 4 is a partial side view of the present invention.
Figure 5:
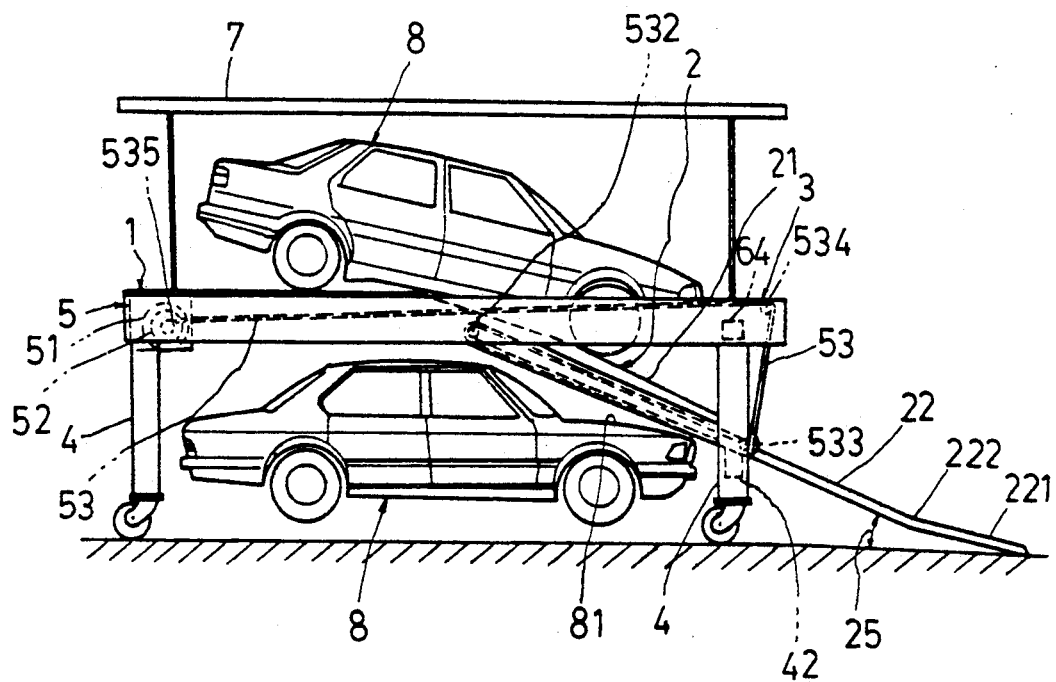
FIG. 5 is an illustration showing the parking of two cars on the present invention.
Figure 7:
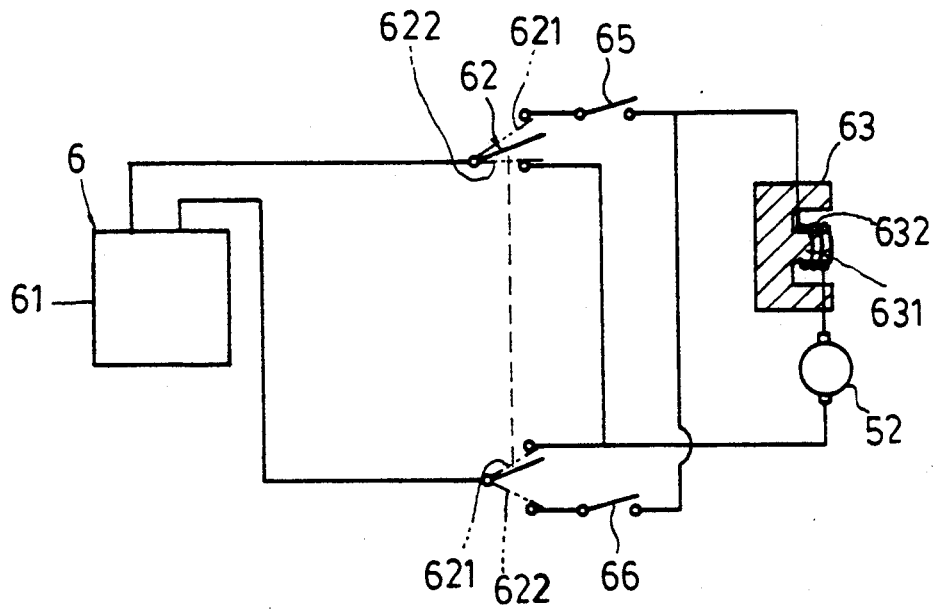
FIG. 7 is an electric circuit of the present invention.

When an upper car 8 is already driven onto the elevated platform 1 through an inclined access 2 as shown in FIG. 5, the control switch 62 (which switch 62 may be mounted on the column 4) is depressed (as switched upwardly to numeral 621 as shown in FIG. 7) to forwardly rotate the motor (or motors) 52 to wind the wire 53 in direction F as shown in FIG. 4.

The wire 53 having its front end 531 secured to the entry plate 22 will pull the entry plate 22 inwardly into the grooves 211 of the guide plate 21 until the bending portion 222 (or other suitable stopping means) is retarded at the front edge 212 of the guide plate 21, thereby retracting the entry plate 22 into or under the guide plate 21. The continuous winding of wire 53 will pull the guide plate 21 upwardly in direction U about the roller 534 by passing the front wire section around the first roller 532 and the second roller 533, thereby levelling the plates 22, 21 as shown in solid line of FIG. 4 (direction U).

Figure 6:
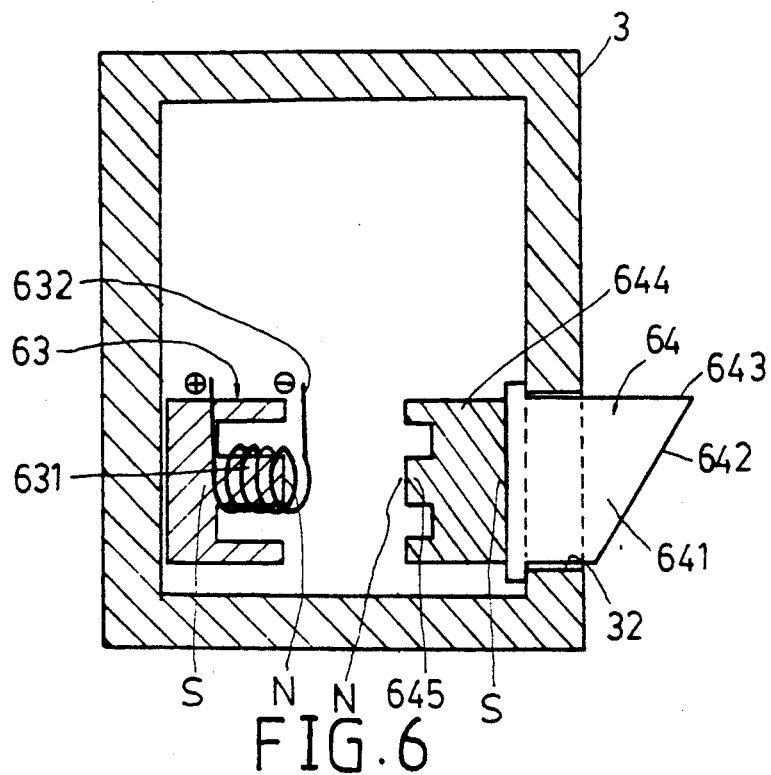
FIG. 6 shows an extended upper stopper of the present invention.

Meanwhile, a forward current when switching on the switch 62 leading to a coil 632 surrounding an iron cylinder 631 of the electromagnet 63 will exert a repulsive fore to urge the upper stopper 64 outwardly through a slot 32 formed in beam 3 as shown in FIG. 6 to retain the levelled access 2 to prevent its falling.

The electromagnet 63 as shown in FIG. 6 includes the iron cylinder 631 exerting a north pole N facing a same north pole N of a permanent magnet 644 of the upper stopper 64 when the current flow forwardly as shown in FIG. 6 and a south pole S on an opposite end of the iron cylinder 631, thereby producing the repulsive force for protruding a latch 641 outwardly for retaining the levelled access 2.

The latch 641 includes an inclined surface 642 tapered downwardly inwardly to be tangentially retracted when upwardly rising the guide plate 21, in which the inclined surface 642 is tapered from a horizontal surface 643 formed on an upper portion of the latch 641.

When the guide plate 21 is raised to its upper position, an actuating rod 24 formed on a rear portion of the plate 21 will actuate the raising limit switch 65 formed at an "upper dead point" on the beam 3 to stop the motor running.

Figure 6A:
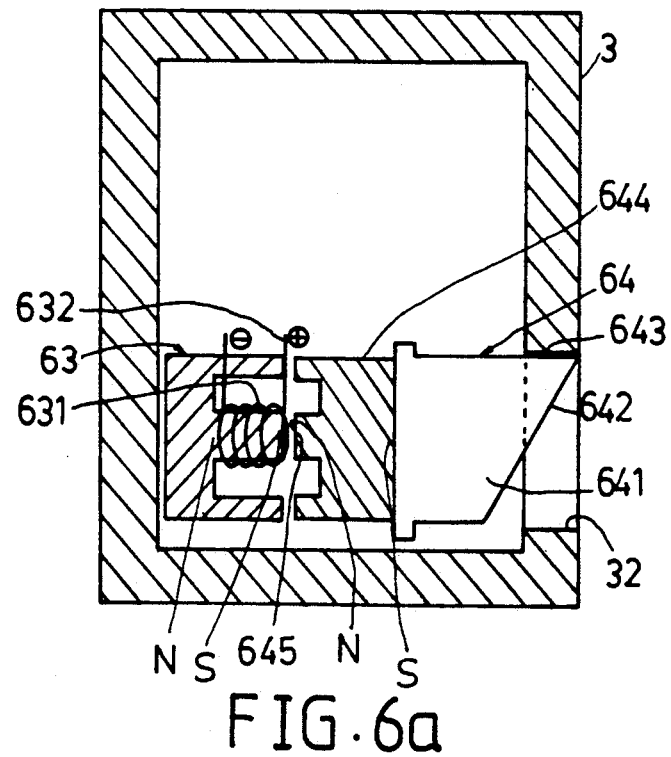
FIG. 6a shows a retracted upper stopper of the present invention.
Figure 8:
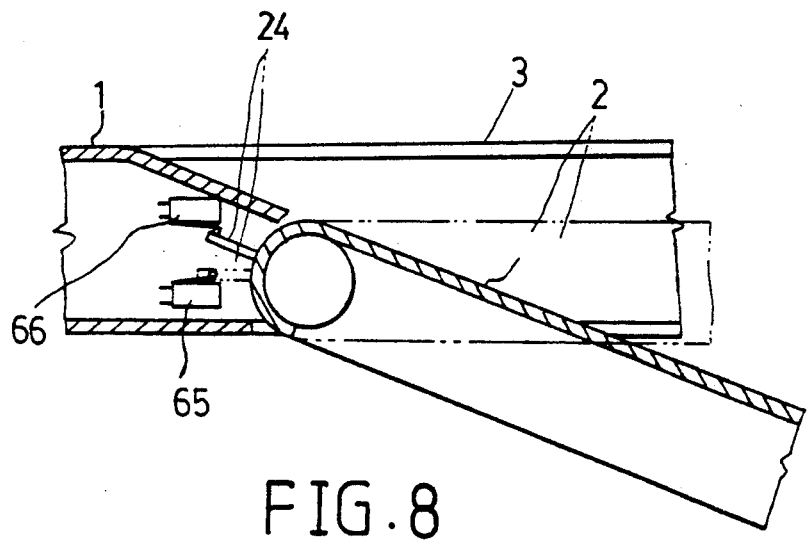
FIG. 8 shows two limit switches of the present invention.

When it is intended to descend the access 2, the control switch 62 is depressed (as switched downwardly to numeral 622 as shown in FIG. 7) to reversely rotate the motor 52 to unwind the wire 53 wound on the reel 51. Simultaneously, a reverse current will lead to the coil 632 to change polarity of that as shown in FIG. 6 to alternate the poles of the electromagnet 63 as shown in FIG. 6a so that a south pole S will face the north pole N of the permanent magnet 644 of the upper stopper 64 to attract the magnet 644 to retract the stopper 64, whereby upon the retraction of the upper stopper 64, the guide plate 21 will no longer be retarded and will be pivoted downwardly about the hinge 23 by the unwinding of the wire 53, until being retarded by a lower stopper 42 formed on the column 4.

The lowering of plate 21 will actuate the descending limit switch 66 formed on the beam 3 at a "lower dean point" of the access movement to stop the motor running. The lower entry plate 22 will be gravitationally lowered to form a sloping surface.

The upper car will then be driven along the sloping path formed by the descending plate 21, and entry plate 22 as shown in FIGS. 2 and 1 for driving the car off the access 2.

The sloping surface of the lowered access 2 may be formed with an acute angle 25 as shown in FIG. 5 preferably less than 15 degrees, but not limited in this invention for providing a suitable height between the access 2 and the floor surface for parking a lower car on the floor without obstructing a car bonnet 81.

The present invention is superior to a conventional parking frame with the following advantages:

1. A car can be driven onto the elevated platform 1 by lowering and extending the access 2 to form a sloping path, whereas another car can be parked on the ground floor without being obstructed by the access 2 and the car parked on the upper platform 1.

2. Just by winding or unwinding of wire 53, the access 2 can be easily raised or lowered for a quick parking service and easy operation.

3. The construction is very simple to reduce installation cost and maintenance problem.

I claim:

1. A parking apparatus comprising:

a fixed elevated horizontal platform mounted on at least two horizontal longitudinal beams mounted on a plurality of supporting columns standing on a ground floor below said platform;

a telescopic access including an upper guide plate pivotally secured to a front edge portion of said platform by a hinge, and a lower entry plate telescopically mounted in two U-shaped grooves formed on two opposite side portions on said guide plate, said telescopic access being operatively lowered and extended to form a sloping surface on the ground floor adapted for driving a car thereon to be parked on said elevated platform, and operatively raised to level said access to form a horizontal plane coplanar to said platform also for levelling the car parked on said platform;

a driving means including at least a reel driven by a motor, and at least a wire having an inner end of said wire wound on said reel and an outer end of said wire connected to a rear portion of said entry plate through a plurality of rollers for operatively lowering and raising said access about said platform; and an electric controller for controlling said driving means for lowering and raising said access, the improvement which comprises:

said entry plate formed with a slight-slope plate on a front edge of said entry plate having a bending portion formed between said slight-slope plate and said entry plate;

each said wire wound on said reel guided through a first roller rotatably mounted on a rear portion of said guide plate, a second roller rotatably mounted on a front portion of said guide plate, and a third roller rotatably mounted on a front portion of said beam; and each said supporting column formed with a wheel on its lower portion for movable purpose.

* * * * *